Dec. 31, 1940.   E. H. SCHNUELLE   2,227,231
TRACTOR HITCH
Filed Aug. 17, 1939   2 Sheets-Sheet 2
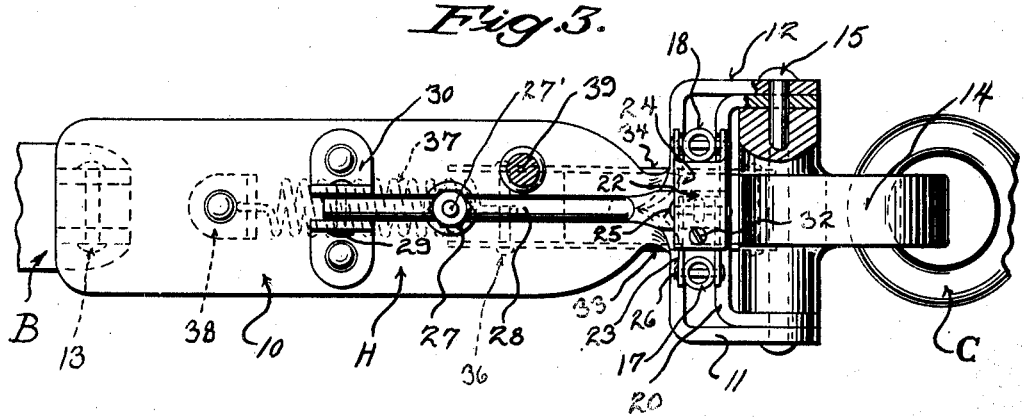
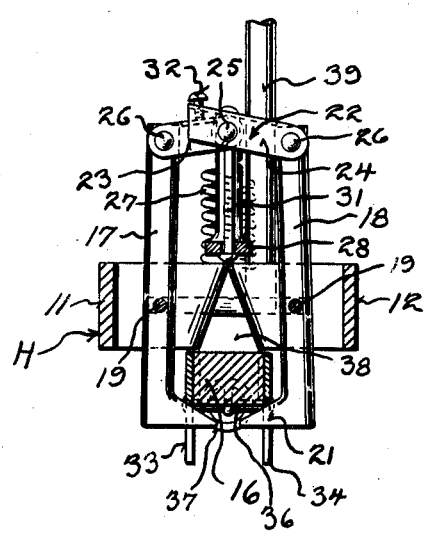
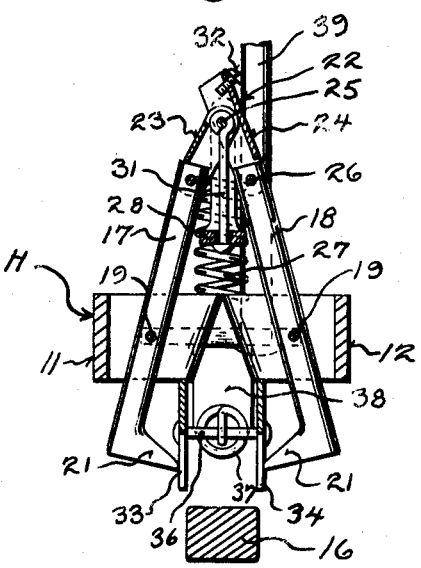
Inventor
E. H. Schnuelle
By
Attorneys Patented Dec. 31, 1940

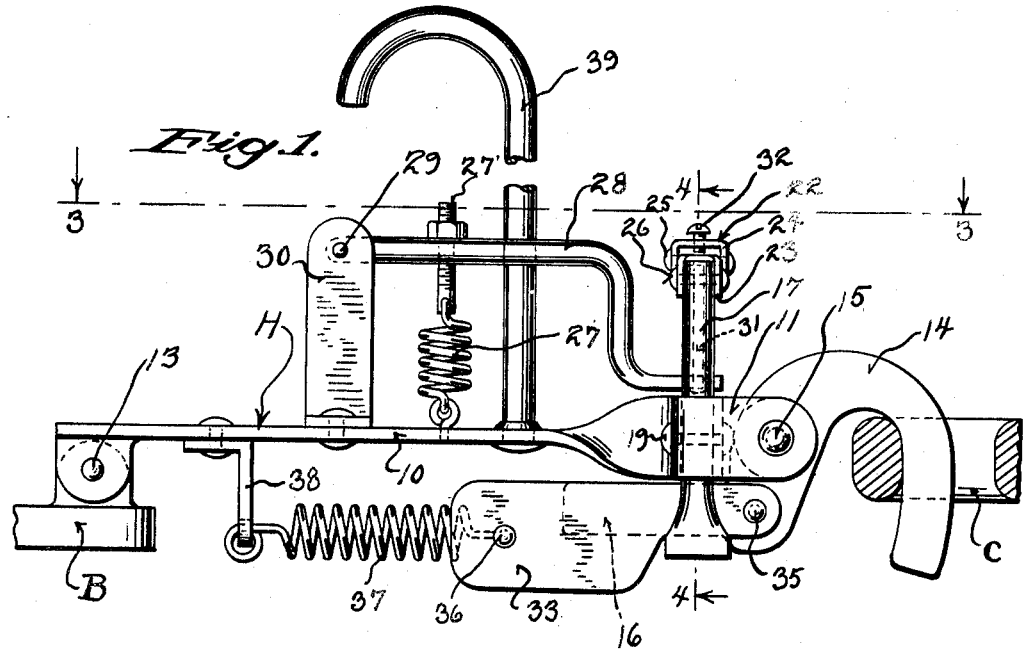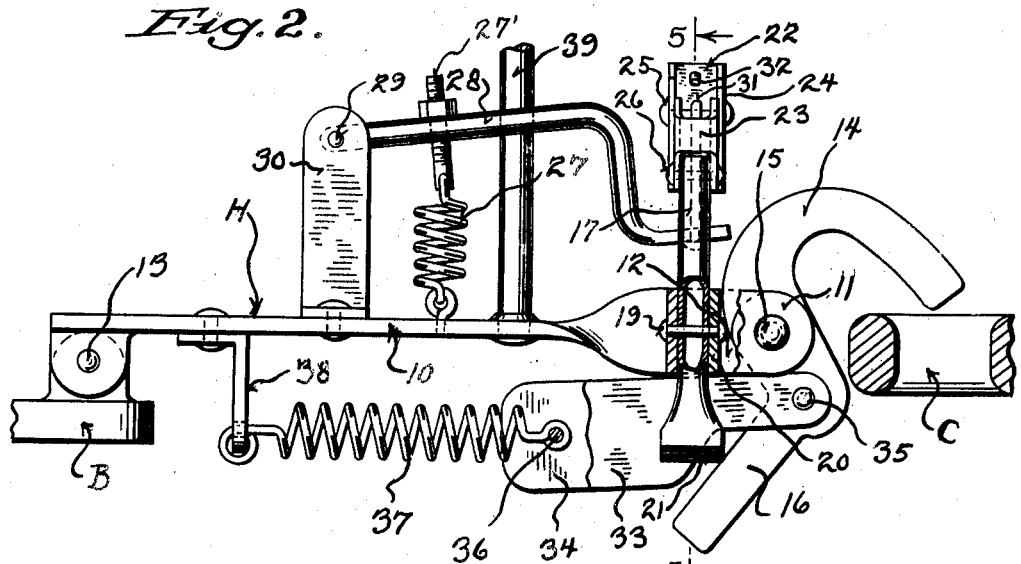

2,227,231

UNITED STATES PATENT OFFICE 2,227,231

TRACTOR HITCH

Eldred H. Schnuelle, Manitowoc, Wis.

Application August 17, 1939, Serial No. 290,603

7 Claims. (Cl. 280—33.16)

This invention appertains to couplings for connecting a trailing vehicle or implement to a drawing vehicle, and more particularly to a novel hitch for connecting a plow or similar implement to a tractor.

One of the primary objects of my invention is to provide a tractor hitch which will permit the releasing of the plow or other implement when a solid object is struck, or when a predetermined pull on the tractor is exceeded, whereby to prevent breakage of the plow point or other parts.

Another salient object of my invention is to provide automatic means for returning the parts of the hitch to their normal set position, whereby to facilitate the coupling of the hitch to the plow or other implement without the necessity of the operator of the tractor leaving his seat.

A further important object of my invention is the provision of a swinging pull hook carried by the plow for engaging in the pull loop or clevis of the tractor, with means engaging the tail of the hook for normally preventing swinging movement of the hook and for permitting swinging movement of the hook when a predetermined pull is exerted thereon, means being provided for permitting the return of the hook to its normal pulling position after the parts have been completely uncoupled.

A still further object of my invention is the provision of releasable latch levers for normally holding the tail of the hook against movement, with means actuated by the hook for movement in front of the latch levers during the movement of the hook to its releasing position, whereby to prevent the return movement of the latch levers to their latching positions until the hook has resumed its normal position.

A still further object of my invention is to provide a tractor hitch of the above character, which will be durable and efficient in use, one that will be simple and easy to manufacture, and one which can be placed upon the market and incorporated with a tractor at a very small cost.

With these and other objects in view, the invention consists in the novel construction, arrangement, and formation of parts, as will be hereinafter more specifically described, claimed, and illustrated in the accompanying drawings, in which drawings:

Figure 1 is a side elevational view of my improved hitch, showing the parts in their pulling position and carried by a plow or similar implement and connected to a clevis of a tractor, the clevis being shown in section.

Figure 2 is a view similar to Figure 1, but showing the parts of the hitch in their released position.

Figure 3 is a horizontal sectional view taken on the line 3—3 of Figure 1, looking in the direction of the arrows.

Figure 4 is a transverse sectional view taken on the line 4—4 of Figure 1, looking in the direction of the arrows, the parts being shown in their normal latched position.

Figure 5 is a transverse sectional view taken on the line 5—5 of Figure 2, looking in the direction of the arrows, the parts being shown in their released position.

Referring to the drawings in detail, wherein similar reference characters designate corresponding parts throughout the several views, the letter H generally indicates my novel hitch for connecting a plow or similar implement drawbar B with the clevis C of a tractor. As the plow drawbar and tractor clevis form no part of the present invention, only sufficient parts have been shown to permit the understanding of my hitch.

The hitch H includes a longitudinally extending pull bar 10 having its rear end bifurcated and twisted to form a pair of spaced parallel legs 11 and 12. The forward end of the pull bar 10 is suitably connected, as at 13, to the plow drawbar B.

Pivotally mounted between the legs 11 and 12 of the pull bar 10 is the swinging pull hook 14. Extending angularly from the hook below the pivot 15 utilized for connecting the hook with the pull bar is a tail-piece 16. The hook is adapted to engage in the loop or clevis C of a tractor, as is readily understood and as is clearly shown in Figure 1 of the drawings. By referring to the mentioned figure, it can be seen that pull on the hook 14 by the clevis C tends to swing the hook on its pivot 15 and move the tail-piece 16 to a depending position, as shown in Figure 2.

In accordance with my invention, I provide swinging latch levers 17 and 18 for normally engaging the tail-piece 16 for preventing swinging movement of the hook 14 under normal plowing conditions. The swinging latch levers 17 and 18 are rockably mounted intermediate their ends upon pivot pins 19, which are carried by the rear end of the pull bar 10. The latch levers are arranged forwardly of the bight portion of the hook 14, and any suitable means can be provided for supporting these latch levers. As illustrated, a bridge strap 20 is rigidly secured to the legs 11 and 12 in parallel relation to the connecting member of said legs, and the pivot pins 19 are supported by said connecting member and the bridge strap 20. The lower ends of the latch levers 17 and 18 have formed thereon inwardly extending cam feet 21.

These feet 21 are adapted to extend under the tail-piece 16, and in order to normally hold the latches against swinging movement and the feet under the tail-piece, the upper terminals of the latch levers 17 and 18 are operatively connected by a toggle 22. This toggle includes links 23 and 24 pivotally connected together by a cross pivot 25. The outer ends of the links 23 and 24 are connected to the latch levers by pivot pins 26. The toggle is normally held in its spread position by a contractile coil spring 27. This coil spring 27 has its opposite ends connected respectively to a trip lever 28 and the pull bar 10. An adjusting bolt 27' connects the spring 27 to the lever 28, so that the tension of the spring can be adjusted to meet different plowing conditions. One end of the trip lever 28 is pivotally connected, as at 29, to a bracket 30, secured to the pull bar. The opposite end of the trip lever 28 is connected to the pivot pin 25 of the toggle by a pull rod 31. Downward swinging movement of the links of the toggle beyond a predetermined point is prevented by an adjustable screw 32 carried by the inner end of the toggle link 24, and this screw engages the inner end of the toggle link 23.

As stated, the spring 27 holds the links of the toggle in their swung-down spread position, and when a pull is exerted on the bill of the hook 14 beyond a predetermined amount for which the spring is set, the tail 16 working on the cam faces of the cam feet 21 will swing the latch levers 17 and 18 on their pivots 19, and the bill of the hook will move out of the clevis C.

When the tail-piece 16 rides beyond the cam feet 21 of the latch levers 17 and 18, the spring 27 will tend to straighten out the links 23 and 24 of the toggle 22 and move the latch levers back to their normal position. In order to prevent this movement until the tail-piece 16 is returned to its horizontal position and the bill of the hook to its lowered position, sliding wing plates 33 and 34 are provided. These plates lie on opposite sides of the hook and are pivotally connected by means of a pin 35 to the hook below the pivot 15 and directly in front of the tail-piece 16. The rear ends of the wing plates 33 and 34 are connected by a cross pin 36, and this cross pin, in turn, has connected thereto a contractile coil spring 37. The opposite end of the spring 37 from the pin 36 is connected to a depending bracket 38 secured to the lower face of the pull bar 10.

As the bill of the hook 14 swings out of the clevis C, and the tail-piece 16 moves out from the cam feet 21, the wing plates 33 and 34 are pulled rearwardly toward the clevis and in front of or between the cam feet 21, and, thus, these wing plates prevent the immediate return of the cam feet to their normal positions. As soon as the clevis pulls away from the hook 14, the spring 37 pulls back on the hook and swings the hook to its normal position, and the tail piece 16 back to its normal horizontal position. The spring 37, likewise, pulls the wing plates 33 and 34 away from the cam feet 21, and the spring 27 can now function to straighten out the links 23 and 24 of the toggle 22, so as to swing the latch levers on their pivots 19 and the cam feet 21 under the tail-piece 16. Thus, the parts are quickly returned to their normal positions.

All the operator has to do is to back up the tractor toward the released plow and partly turn and grasp the upstanding handle 39 carried by the pull bar 10. When the tractor is backed the proper distance, the operator pulls up on the handle 39 and lifts the hitch and then drops the hitch with the bill of the hook 14 into the clevis C. The operator can now resume normal plowing.

From the foregoing description, it can be seen that I have provided an exceptionally simple and durable hitch for releasably connecting a tractor with a plow or similar implement, and which will permit the automatic releasing of the plow when the plow exceeds a predetermined pull on the tractor.

Changes in detail may be made without departing from the spirit or the scope of my invention, but what I claim as new is:

1. A tractor hitch comprising, a pull bar connected with a plow, a swinging hook pivotally connected to the pull bar for movement into and out of the clevis of a tractor, a tail-piece formed on the hook below the pivot point thereof, swinging latch levers engaging the tail-piece normally resisting swinging movement of the hook under normal pull of the plow, the latch levers being adapted to release the tail-piece when a predetermined pull is exceeded on the hook, means normally tending to return and hold the latch levers to a predetermined position, spring means normally tending to return the hook to a normal position, and means operatively connected to the hook for movement between the latch levers for holding the latch levers in an inoperative position until the return of the hook and the tail-piece to their normal positions.

2. A tractor hitch comprising, a pull bar, means for connecting one end of the pull bar to a farm implement, a hook, means pivotally connecting the hook to the pull bar, and angularly extending tail-piece formed on the rear end of the hook below the pivot point of the hook, latch levers pivotally secured to the pull bar having cam feet, spring means normally holding the latch levers in a predetermined position with the cam feet under the tail-piece of the hook to normally hold the hook in a lowered drawing position against accidental swinging movement under normal plowing conditions, the latch levers being adapted to be moved against the tension of their spring means when pull on the hook exceeds a predetermined amount, spring means normally tending to return the hook to a normal lowered position after the release thereof from a tractor, and wing plates pivotally connected to the hook for movement between the cam feet of the latch levers for holding the latch levers against return movement to their normal positions until the hook and tail-piece have returned to their normal positions.

3. A tractor hitch comprising, a pull bar, means for connecting one end of the pull bar to a plow, a hook, means pivotally connecting the hook to the pull bar, an angularly extending tail-piece formed on the rear end of the hook below the pivot point of the hook, latch levers pivotally secured to the pull bar having cam feet, spring means normally holding the latch levers in a predetermined position with the cam feet under the tail-piece of the hook to normally hold the hook in a lowered drawing position against accidental swinging movement under normal plowing conditions, the latch levers being adapted to be moved against the tension of their spring means when pull on the hook exceeds a predetermined amount, spring means normally tending to return the hook to a normal lowered position after the release thereof from a tractor, and wing plates pivotally connected to the hook for movement between the cam feet of the latch levers for holding the latch levers against return movement to their normal positions until the hook and tail-piece have returned to their normal positions, the spring for the hook being connected to the wing plates.

4. A tractor hitch comprising, a pull bar, means for connecting the pull bar to a plow, a hook pivotally connected to the drawbar for connection with a tractor, an angularly extending tail-piece formed on the rear end of the hook below the pivot point of the hook, latch levers rockably mounted intermediate their ends in rear of the hook, cam feet on the lower ends of the latch levers for normally engaging under the tail-piece of the hook, a toggle connecting the upper ends of the latch levers together including links pivotally connected to the levers and to one another, spring means normally tending to move the links downward to a spread position with the cam feet to their latched positions, and means for preventing movement of the cam feet to their normal latched position when the tail-piece is moved away from the cam feet, including winged plates pivotally secured to the hook below the pivot point thereof for movement between the cam feet when the hook is in a raised position and the tail in a lowered position, and a contractile coil spring connected to the wing plates and to the pull bar.

5. A tractor hitch comprising, a pull bar, a swinging hook rockably mounted upon the pull bar, a tailpiece on the hook extending beyond the pivot, and means cooperating with the tailpiece to prevent swinging of the hook under normal farming conditions, including a toggle joint, and spring means preventing breaking and collapsing of the joint under said normal farming conditions.

6. A tractor hitch comprising, a pull bar, a swinging hook rockably mounted upon the pull bar, means cooperating with the hook for preventing swinging movement thereof under normal farming conditions, including a toggle joint, spring means preventing breaking and collapsing of the toggle joint under said normal farming conditions and for returning the toggle joint to its open spread position, and means for holding the toggle joint against a complete open spread position under all conditions.

7. A tractor hitch comprising, a pull bar, a swinging hook rockably mounted upon the pull bar, means cooperating with the hook for preventing swinging movement thereof under normal farming conditions, including a toggle joint, spring means preventing breaking and collapsing of the toggle joint under said normal farming conditions and for returning the toggle joint to its open spread position, and means for holding the toggle joint against a complete open spread position under all conditions, said spring means being adjustable to vary the pressure thereof acting on said toggle joint.

ELDRED H. SCHNUELLE.